UNITED STATES PATENT OFFICE.

WILLIAM O. KAISER AND GEORGE F. STROEBEL, OF BURLINGTON, IOWA.

BEVERAGE.

1,164,287. Specification of Letters Patent. Patented Dec. 14, 1915.

No Drawing. Application filed August 6, 1915. Serial No. 43,982.

*To all whom it may concern:*

Be it known that we, WILLIAM O. KAISER and GEORGE F. STROEBEL, citizens of the United States, residing at Burlington, in the county of Des Moines and State of Iowa, have invented certain new and useful Improvements in Beverages; and we hereby declare that the following is a full, clear, and exact description thereof, reference being had to the accompanying drawings, which form part of this specification.

This invention relates to unfermented beverages and the process of making same. Its object is to produce a new beverage having an unfermented base made from malt, cereals, hops and yeast and enriched by the food values of the yeast cells or yeast contents and yet entirely free from alcohol. Such beverage is produced by the process hereafter explained, and being unfermented is entirely free from alcohol and therefore unobjectionable for sale and use as a beverage where fermented and spirituous liquors are prohibited.

The "base" of the beverage is made out of barley malt, raw cereals, hops, and yeast. Barley malt 40 lbs., raw cereal 18 lbs., hops ¼ lb., commercial yeast 2 lbs., water 31 gals. will produce one barrel (330 bottles) of the base containing about 7% of dissolved solids.

When manufacturing the beverage in quantity, the "base" may be practically prepared as follows:—The ground malt is mashed or infused with water, in the proportion of about 100 lbs. malt to one barrel of water for one and three quarters hours at a temperature of about 30° Réaumur, until it becomes "peptonized".

In another vessel is placed ground raw cereal and water, in the proportions of about 75 lbs. cereal to each barrel of water; after being mashed or infused 25 minutes at a temperature of about 35° Réaumur a part of the prepared lautermash or malt mash liquor is added to the raw cereal mash in the proportion of about 10% lautermash to 90% of raw cereal mash. The mixture is then kept at a temperature of about 57° Réaumur for about 20 minutes until the diastase converts a part of the starch contained in the cereal into sugar. The remainder of the malt lautermash is now added to the mixture and the whole boiled for about one hour to destroy or stop further action of the diastase. The mixture is now transferred to the malt mash tub, containing the residue of the ground malt, and the temperature raised to about 62½° Réaumur in five minutes, at which temperature all the starch is converted into unfermentable sugar by the diastase still remaining in the ground malt mash. The mixture is then allowed to settle for about 30 minutes then the entire wort is drawn into the kettle and boiled 2 hours, after which one-eighth pound hops per barrel is added and the boiling continued for about 30 minutes. Then about 2 lbs. commercial yeast per barrel are added to the boiling liquid, the boiling continued about 20 minutes more, after which the remainder of the hops (⅛ lb. per barrel) is added and the boiling continued for about ten minutes. The product is cooled to 1° Réaumur and kept at about this temperature for about 24 hours; it is then reduced to the freezing point and aged for 8 or 10 days, and finally filtered, carbonated and bottled.

When the commercial yeast is added to the boiling wort, and the boiling continued, the heat kills the yeast by preventing fermentation thereof and ruptures the yeast cells, and the contents of the cells are dissolved in the mixture adding much to its food value and flavor, and also aids in ridding the product of undesirable albuminoids and changes the general character of the entire solution.

We preferably use commercial yeast by which we can get the same food values as obtained from brewer's yeast, but we do not wish to restrict the invention to commercial yeast as other yeast used in the manner hereinafter specified will produce good results. This base may be medicated by various medicinal agents preferably added to it when cold, and the whole filtered to produce a clear liquid.

The following formula gives one example of medicaments which may be used for one barrel of the beverage:—Iron pyrophosphate (soluble) 165 grains; iron peptonized 165 grains; calcium lactophosphate 83 grains; citric acid 990 grains. These medicaments are first dissolved in water and then added to one barrel (or 330 bottles) of the "base". The medicaments enhance the tonic and food values of the beverage.

The "raw cereals" may consist of rice, grits, corn products or other cereal grains.

What we claim is:

1. An unfermented base made from malt, hops and yeast and containing the yeast cell contents, or extract, substantially as specified.

2. An unfermented beverage made from malt, hops and commercial yeast and containing the yeast cell contents, or extract substantially as specified.

3. An unfermented beverage made from malt, hops and yeast and containing the yeast cell contents or extract and a medicament, substantially as specified.

4. The process of making an unfermented base beverage consisting in making a mash of ground malt and water and heating same until it becomes peptonized; making a raw cereal mash of cereals and water and heating same; then adding part of the mash of ground malt to the raw cereal mash and heating same to convert the cereal starch into sugar; then adding the remainder of the mash of ground malt and heating the mixture to stop further action of the diastase; then adding to the mixture the residue of the ground malt mash and raising the temperature to convert the starch into unfermented sugar; then separating the wort and boiling same; then adding hops to the mixture and boiling same; then adding commercial yeast and boiling same; then adding more hops and boiling same; then cooling the mixture; and aging same, and finally filtering and carbonating the resultant beverage.

5. The process of making an unfermented base beverage consisting in making a mash of ground malt and water and heating same until it becomes peptonized; making a raw cereal mash of cereals and water and heating same; then adding part of the mash of ground malt to the raw cereal mash and heating same until the diastase converts the cereal starch into sugar; then adding the remainder of the mash of ground malt and boiling the mixture to stop further action of the diastase; then adding to the mixture the residue of the ground malt and raising the temperature quickly to convert the starch into unfermented sugar; then separating the wort and boiling same; then adding about ⅓ lb. hops per barrel to the mixture and boiling same; then adding about 2 lbs. commercial yeast per barrel to the mixture and boiling same; then adding about ⅛ lb. hops per barrel to the mixture and boiling same; then cooling the mixture, aging same, and finally filtering and carbonating the resultant liquid, substantially as described.

6. The herein described process of making an unfermented base beverage, consisting in making a mash of ground malt and water and heating same at a temperature of about 30° Réaumur for about 105 minutes; making a raw cereal mash of cereals and water and heating same at a temperature of about 35° Réaumur; then adding about 10% of the mash of ground malt to the raw cereal mash and heating same at about 57° Réaumur for about 20 minutes until the diastase converts the cereal starch into sugar; then adding the remainder of the mash of ground malt and boiling the mixture for about 60 minutes to stop further action of the diastase; then adding to the mixture the residue of the ground malt and raising the temperature to about 62½° Réaumur in about 5 minutes to convert the starch into unfermented sugar; then allowing the mixture to settle for about 30 minutes; then separating the wort and boiling same for about 120 minutes; then adding about ⅓ lb. hops per barrel to the mixture and boiling for about 30 minutes; then adding about 2 lbs. commercial yeast per barrel to the mixture and boiling same for about 20 minutes; then adding about ⅛ lb. hops per barrel and boiling same for about 10 minutes; then cooling the mixture to about 1° Réaumur for about 24 hours; then reducing the temperature of the mixture to the freezing point and aging same; and finally filtering and carbonating the resultant liquid.

In testimony that we claim the foregoing as our own, we affix our signatures in presence of two witnesses.

WILLIAM O. KAISER.
GEORGE F. STROEBEL.

Witnesses:
C. T. BUCHMEASTER,
A. J. WIRTH.